United States Patent Office 2,714,555
Patented Aug. 2, 1955

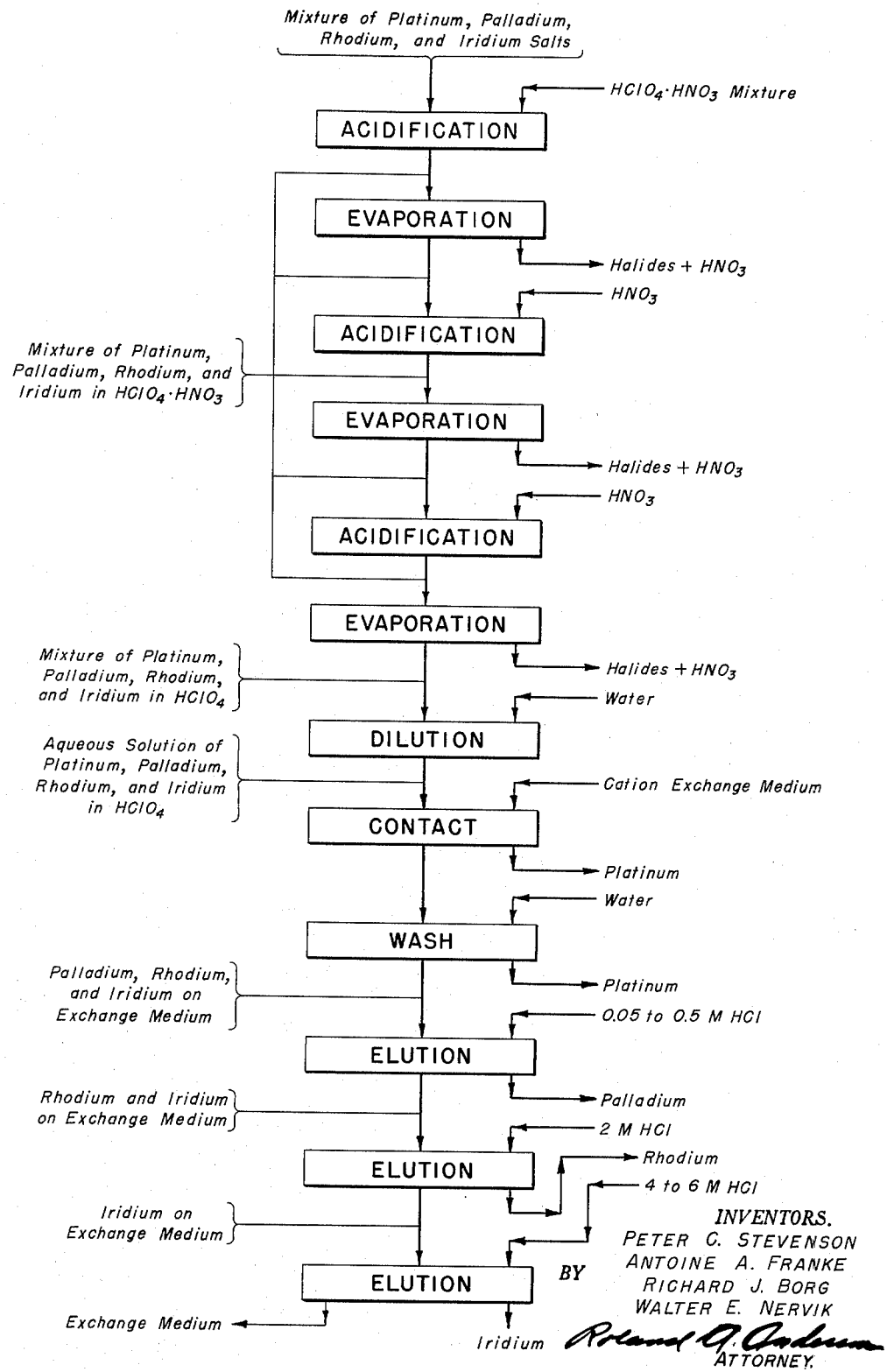

2,714,555

METHOD OF SEPARATING CERTAIN PLATINUM GROUP METALS WITH CATION EXCHANGE RESINS

Peter C. Stevenson, Livermore, Antoine A. Franke, San Francisco, Richard J. Borg, Millbrae, and Walter E. Nervik, Piedmont, Calif., assignors to the United States of America as represented by the United States Atomic Energy Commission Application August 23, 1954, Serial No. 451,725

12 Claims. (Cl. 75—121)

The invention described herein may be manufactured and used by or for the Government for governmental purposes without the payment of any royalty thereon.

This invention relates to a method of separating certain platinum group metals from a mixture thereof, and, more particularly, to such a method whereby the individual metals, platinum, palladium, rhodium, and iridium, are adsorbed on an ion exchange medium and subsequently fractionally eluted therefrom.

Existing methods of separating these platinum group metals are limited in the scope and efficiency of their application. These methods are based largely on precipitation of the metal or metals with subsequent separation and treatment of the precipitate, or on extraction of the metallic values in certain solvent media. Platinum, for example, has been separated from mixtures thereof with other matter by precipitation of the platinum with ammonium chloride as ammonium chloroplatinate. Large losses, as well as heavy contamination with extraneous material, characterize this separation. Extraction from potassium pyrosulphate has been used to separate platinum from other matter, but this method tends to be tedious and inefficient. A method which affords good recovery of the metals but requires extended periods of time is based upon the basic hydrolysis of the chloro compounds of the subject metals with conventional separation of the precipitated hydroxides. This method involves many individual steps and is therefore subject to error. Other methods in present use depend largely on the precipitation of the oximes of the metals with such organic reagents as alpha furildioxime and dimethylglyoxime, or the hydrated metallic oxides with sodium bromate and sodium bicarbonate. Here again, as with the method of separation of the precipitated hydroxides supra, the principal disadvantage is the long period of operational time required to effect the desired separation.

The present invention accomplishes the separation of these platinum group metals efficiently and expeditiously by means of adsorption on and individual elution from a suitable ion exchange medium. In this invention an aqueous solution of a mixture of any of the metals, platinum, palladium, rhodium, and iridium is run into the top of a column packed with a suitable cation exchange material. The platinum ions pass through the column and are recovered; the palladium, rhodium, and iridium are adsorbed by the ion exchange medium. The adsorbed ions are subsequently separately eluted from the column in the stated order by washing the column with hydrochloric acid of increasing molarity, and are collected as eluted.

Accordingly, it is a primary object of this invention to provide a novel method for the separation of platinum, palladium, rhodium, and iridium from mixtures thereof.

Another object of the invention is to furnish a method whereby platinum, palladium, rhodium, and iridium may be rapidly separated from mixtures thereof.

Yet another object of the invention is to furnish a method whereby the individual components of mixtures of palladium, platinum, rhodium, and iridium may be separated therefrom in a state of high purity.

A further object of the invention is to provide a process whereby platinum, palladium, rhodium, and iridium may be efficiently separated from a mixture thereof.

Other objects of the invention will become apparent from a consideration of the following description taken in conjunction with the accompanying flowsheet which constitutes a diagrammatical representation of the consecutive processing stages involved in the subject separation.

In accordance with the present invention, a quantity of a mixture of any of the salts of the four metals, platinum, palladium, iridium and rhodium is dissolved in a mixture of perchloric and nitric acid. The platinum, palladium, and rhodium ions are thus oxidized to the $+4$, $+2$ and $+3$ valence states, respectively; the iridium ions are oxidized to the $+6$ state. Most of the nitric acid is then removed from the perchloric-nitric acid solution of the metal ions by heating said solution, thereby evaporating the nitric acid and reducing the solution to near dryness. As the nitric acid is thus fumed from the solution, any halide ions as well as any osmium or ruthenium ions which are present in the solution are volatilized. More nitric acid is then added to the solution and the cycle of evaporation alternated with acidification is repeated until all traces of halide ion have volatilized with the nitric acid, leaving a fuming perchloric acid solution of the metal ions.

To this solution containing the oxidized metals is added a quantity of water to cool and dilute the fuming perchloric acid and the solution is placed on a column of a suitable cation exchange medium. An exchange medium having a high equilibrium capacity such as the sulfonated aromatic hydrocarbon polymers should be used. For example, 2% to 16% cross-linked, 250 mesh spherical fines Dowex 50, or its equivalent, provides excellent separation of these metals. Increased efficiency is obtained in this process if the perchloric acid solution of the ions is heated to less than 95° C. before placing on a jacketed column, said jacket being maintained at a temperature commensurate with that of the heated solution by circulation of an appropriate heat exchange medium therethrough.

When placed on the column, the palladium, rhodium, and iridium are immediately securely complexed by the exchange medium and retained thereon. The yellow platinum ions, which are not adsorbed under these conditions, pass readily through the exchange medium, and are collected. An aqueous wash assures removal of any residual platinum ions from the medium. The straw-colored palladium fraction is next eluted by the addition to the medium of a quantity of 0.05 M to 0.5 M hydrochloric acid. After the palladium is eluted, 2 M hydrochloric acid is then added to the system, thereby eluting the golden-colored rhodium fraction. The blue to green iridium fraction is subsequently removed by contacting the adsorbing medium with 4 to 6 M hydrochloric acid. The eluted metal fractions are separately collected upon elution from the medium. In the case of rhodium and iridium, elution is hastened by raising the temperature of the eluting solution, thereby increasing the rate of the reactions involved. This step materially aids in the efficient recovery of the subject metals.

It is to be understood that the repeated vaporization of the perchloric-nitric acid solution of the metal halides in this separation procedure must be pursued until all traces of halide ions are removed since the presence of such ions will be detrimental to the purity of the separation. If these halide ions are not removed from said solution, the platinum fraction as eluted from the ion exchange medium will contain small amounts of palladium, rhodium, and iridium. In addition, sulfate ions should not be present in the solution since they may prevent the adsorption of rhodium and iridium by the resin. This is due to the formation of neutral or anionic complexes with the metal cations. Preliminary removal of these sulfate ions may be readily accomplished by methods well known in the art such as barium or lead precipitation.

A further illustration of the process of the subject invention is afforded by the following example:

Example

Four solutions consisting of one each of 10 milligrams of the chlorides of platinum, palladium, rhodium, and iridium in 1 milliliter of 6 M hydrochloric acid were prepared. These solutions were combined and added to 1 milliliter of concentrated perchloric acid and 5 milliliters of concentrated nitric acid and the resultant solution was evaporated to ca. 0.5 milliliter to remove the chlorides by oxidation to chlorine gas. To the residual solution was added ca. 2 milliliters of nitric acid, and the solution was again evaporated to ca. 0.5 milliliter. This step of the process was repeated until all chloride ion was oxidized and fumed off, leaving the metal ions in ca. 0.5 milliliter of fuming perchloric acid. The acid solution was quenched with ca. 35 milliliters of water and placed on the top of an ion exchange column packed with 12% cross-linked Dowex 50 spherical fines cation exchange resin. The ochre-colored platinum fraction was eluted first, and the column was subsequently washed with ca. 10 milliliters of water to remove all traces of platinum. One-half molar hydrochloric acid was added to the column until the entire brown-yellow palladium band was eluted. The golden band of rhodium was eluted with a quantity of hot 2 M hydrochloric acid. The blue-green iridium fraction was eluted with hot 4 M hydrochloric acid. The individual metal fractions were analyzed by methods well known in the art. Results of these analyses showed a recovery for platinum of 85%; for palladium, 35%; for rhodium, 125%; and for iridium, 45%.

In this experimental data, it is obvious that the percentage of rhodium indicated was in error and, in all probability, this value reflects the inclusion in this fraction from the column of portions of certain adjacent fractions, namely, palladium and iridium. In subsequent experimental runs utilizing this method, yields in excess of 80% of a very pure metal product were obtained.

While there have been herein described what may be considered to be the principal and preferred embodiments of the invention, it will be understood that various modifications may be made therein and it is intended to cover all such modifications as may fall within the scope of the appended claims.

What is claimed is:

1. A method of separating a mixture of certain platinum group metals comprising repeatedly evaporating a solution of the salts thereof in a mixture of perchloric and nitric acid to near dryness, diluting and cooling the resulting halide-free perchloric acid solution with water, placing said solution on a bed of high equilibrium capacity cation exchange medium, recovering the separated effluent platinum solution, washing the exchange medium with water, recovering the effluent platinum wash solution, combining said platinum solutions, placing a quantity of 0.05 M to 0.5 M hydrochloric acid on said exchange medium, recovering the effluent palladium solution, placing a quantity of 2 M hydrochloric acid on said exchange medium, recovering the effluent rhodium solution, placing a quantity of 4 to 6 M hydrochloric acid on said exchange medium, and recovering the effluent iridium solution.

2. A method of separating a mixture of platinum, palladium, rhodium, and iridium comprising placing an aqueous, halogen-free solution of the salts of said metal ions on a suitable cation exchange medium, recovering the separated effluent platinum solution, washing the exchange medium with water, recovering the wash solution, combining the effluent platinum solution with the wash solution, placing a quantity of 0.05 M to 0.5 M hydrochloric acid on said exchange medium, recovering the effluent palladium solution, placing a quantity of 2 M hydrochloric acid on said exchange medium, recovering the effluent rhodium solution, placing a quantity of 4 to 6 M hydrochloric acid on said exchange medium, and recovering the effluent iridium solution.

3. A method of separating a mixture of platinum, palladium, and rhodium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, recovering the separated effluent platinum solution, washing the exchange medium with water, recovering the effluent platinum wash solution, combining the platinum solutions, placing a quantity of 0.05 M to 0.5 M hydrochloric acid on said exchange medium, recovering the effluent palladium solution, placing a quantity of 2 M hydrochloric acid on said exchange medium, and recovering the effluent rhodium solution.

4. A method of separating a mixture of platinum, iridium, and rhodium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, recovering the separated effluent platinum solution, washing the exchange medium with water, recovering the effluent platinum wash solution, combining the platinum solutions, placing a quantity of 2 M hydrochloric acid on said exchange medium, recovering the effluent rhodium solution, placing a quantity of 4 to 6 M hydrochloric acid on said exchange medium, and recovering the effluent iridium solution.

5. A method of separating a mixture of platinum, iridium, and palladium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, recovering the separated effluent platinum solution, washing the exchange medium with water, recovering the effluent platinum wash solution, combining the platinum solutions, placing a quantity of 0.05 M to 0.5 M hydrochloric acid on said exchange medium, recovering the effluent palladium solution, placing a quantity of 4 to 6 M hydrochloric acid on said exchange medium, and recovering the effluent iridium solution.

6. A method of separating a mixture of platinum and palladium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, recovering the separated effluent platinum solution, washing the exchange medium with water, recovering the effluent platinum wash solution, combining the platinum solutions, placing a quantity of 0.05 M to 0.5 M hydrochloric acid on said exchange medium, and recovering the effluent palladium solution.

7. A method of separating a mixture of platinum and rhodium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, recovering the separated effluent platinum solution, washing the exchange medium with water, recovering the effluent platinum wash solution, combining the platinum solutions, placing a quantity of 2 hydrochloric acid on said exchange medium, and recovering the effluent rhodium solution.

8. A method of separating a mixture of platinum and iridium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, recovering the separated effluent platinum solution, washing the exchange medium with water, recovering the effluent platinum wash solution, combining the platinum solutions, placing a quantity of 4 to 6 M hydrochloric acid on said exchange medium, and recovering the effluent iridium solution.

9. A method of separating a mixture of palladium, rhodium, and iridium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, placing a quantity of 0.05 to 0.5 M hydrochloric acid on said exchange medium, recovering the effluent palladium solution, placing a quantity of 2 M hydrochloric acid on said exchange medium, recovering the effluent rhodium solution, placing a quantity of 4 to 6 M hydrochloric acid on said exchange medium, and recovering the effluent iridium solution.

10. A method of separating a mixture of palladium and rhodium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, placing a quantity of 0.05 to 0.5 M hydrochloric acid on said exchange medium, recovering the effluent palladium solution, placing a quantity of 2 M hydrochloric acid on said exchange medium, and recovering the effluent rhodium solution.

11. A method of separating a mixture of palladium and iridium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, placing a quantity of 0.05 to 0.5 M hydrochloric acid on said exchange medium, recovering the effluent palladium solution, placing a quantity of 4 to 6 M hydrochloric acid on said exchange medium, and recovering the effluent iridium solution.

12. A method of separating a mixture of rhodium and iridium comprising repeatedly evaporating a solution of the salts thereof in a mixture of perchloric and nitric acid to near dryness, diluting and cooling the resulting halide-free perchloric acid solution with water, placing said solution on a bed of a cation exchange medium, placing a quantity of 2 M hydrochloric acid on said exchange medium, recovering the effluent rhodium solution, placing a quantity of 4 to 6 M hydrochloric acid on said exchange medium, and recovering the effluent iridium solution.

References Cited in the file of this patent
UNITED STATES PATENTS 662,299    Great Britain             Dec. 5, 1951